US009637605B2

(12) United States Patent
Yokota et al.

(10) Patent No.: US 9,637,605 B2
(45) Date of Patent: May 2, 2017

(54) BIAXIALLY ORIENTED CAVITATED POLYLACTIC ACID FILM

(71) Applicants: Nao Yokota, Anpachi-Gun (JP); Mark S. Lee, North Kingstown, RI (US); Claudio M. Paulino, South Kingstown, RI (US)

(72) Inventors: Nao Yokota, Anpachi-Gun (JP); Mark S. Lee, North Kingstown, RI (US); Claudio M. Paulino, South Kingstown, RI (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 558 days.

(21) Appl. No.: 13/673,564

(22) Filed: Nov. 9, 2012

(65) Prior Publication Data

US 2013/0122280 A1    May 16, 2013

Related U.S. Application Data

(60) Provisional application No. 61/558,344, filed on Nov. 10, 2011.

(51) Int. Cl.
*B32B 3/26*     (2006.01)
*B32B 15/09*    (2006.01)
(Continued)

(52) U.S. Cl.
CPC .............. *C08J 9/0038* (2013.01); *B32B 3/26* (2013.01); *B32B 15/09* (2013.01); *B32B 15/20* (2013.01);
(Continued)

(58) Field of Classification Search
None
See application file for complete search history.

(56) References Cited

U.S. PATENT DOCUMENTS 4,877,815 A * 10/1989 Buckmaster ........... C08J 9/0033
                                             264/DIG. 13
5,023,279 A *  6/1991 Buckmaster ........... C08J 9/0033
                                             264/DIG. 13
(Continued)

FOREIGN PATENT DOCUMENTS

EP    1-385-899        2/2007
JP    2006-089587 A *  4/2006
(Continued)

*Primary Examiner* — Vivian Chen
(74) *Attorney, Agent, or Firm* — Morrison & Foerster LLP

(57) ABSTRACT

A biaxially oriented laminate film including a core layer including a blend of crystalline polylactic acid polymer and a metal salt phosphorus-containing nucleating agent which is biaxially oriented at low transverse direction orientation temperatures to impart a degree of cavitation around the metal salt phosphorus-containing metal such that a white opaque cavitated appearance and a lower film density and improved mechanical properties are obtained. The laminate film could further have additional layers such as a heat sealable layer disposed on one side of said core layer including an amorphous polylactic acid resin and/or a polylactic acid resin-containing layer disposed on the side of the core layer opposite the heat sealable layer, a metal layer, or combinations thereof.

29 Claims, 4 Drawing Sheets

(51) Int. Cl.

| | |
|---|---|
| B32B 15/20 | (2006.01) |
| B32B 27/18 | (2006.01) |
| B32B 27/36 | (2006.01) |
| B32B 37/15 | (2006.01) |
| B32B 37/24 | (2006.01) |
| C08L 67/04 | (2006.01) |
| C08L 23/08 | (2006.01) |
| C08K 5/49 | (2006.01) |
| C08K 5/51 | (2006.01) |
| C08K 5/5317 | (2006.01) |
| B29C 47/06 | (2006.01) |
| B29C 55/12 | (2006.01) |
| C08J 9/00 | (2006.01) |
| B32B 27/08 | (2006.01) |
| B32B 27/20 | (2006.01) |
| C08J 5/18 | (2006.01) |
| B32B 38/00 | (2006.01) |
| B29C 47/00 | (2006.01) |
| C09J 167/04 | (2006.01) |

(52) U.S. Cl.
CPC .............. *B32B 27/08* (2013.01); *B32B 27/18* (2013.01); *B32B 27/205* (2013.01); *B32B 27/36* (2013.01); *B32B 37/153* (2013.01); *C08J 5/18* (2013.01); *C08K 5/5317* (2013.01); *B29C 47/0021* (2013.01); *B29C 47/0057* (2013.01); *B29C 47/06* (2013.01); *B29C 55/12* (2013.01); *B32B 38/0032* (2013.01); *B32B 2037/243* (2013.01); *B32B 2037/246* (2013.01); *B32B 2038/0028* (2013.01); *B32B 2255/10* (2013.01); *B32B 2255/205* (2013.01); *B32B 2305/02* (2013.01); *B32B 2307/41* (2013.01); *B32B 2307/518* (2013.01); *B32B 2307/54* (2013.01); *B32B 2307/7163* (2013.01); *B32B 2307/72* (2013.01); *B32B 2307/7244* (2013.01); *B32B 2307/7246* (2013.01); *B32B 2311/24* (2013.01); *B32B 2367/00* (2013.01); *C08J 2367/04* (2013.01); *C08K 5/49* (2013.01); *C08K 5/51* (2013.01); *C08L 23/0869* (2013.01); *C08L 67/04* (2013.01); *C09J 167/04* (2013.01); *Y10T 428/1338* (2015.01); *Y10T 428/1341* (2015.01); *Y10T 428/1355* (2015.01); *Y10T 428/1379* (2015.01); *Y10T 428/249953* (2015.04); *Y10T 428/249987* (2015.04); *Y10T 428/249988* (2015.04); *Y10T 428/249991* (2015.04); *Y10T 428/31681* (2015.04); *Y10T 428/31786* (2015.04)

(56) References Cited

U.S. PATENT DOCUMENTS

| | | | | |
|---|---|---|---|---|
| 5,032,621 | A | * | 7/1991 | Buckmaster ............ C08J 9/0033 264/DIG. 13 |
| 5,464,878 | A | * | 11/1995 | Nemphos .................... C08J 9/12 521/50 |
| 5,756,651 | A | * | 5/1998 | Chen et al. .................... 528/354 |
| 6,194,060 | B1 | * | 2/2001 | Amon ....................... B32B 3/26 264/46.1 |
| 6,572,960 | B2 | * | 6/2003 | Amon ..................... B32B 27/32 264/173.15 |
| 6,767,501 | B1 | * | 7/2004 | Kirjavainen ........ B29C 47/0021 264/288.4 |
| 6,793,854 | B1 | * | 9/2004 | Kirjavainen ............ B29C 44/20 264/210.4 |
| 7,531,585 | B2 | | 5/2009 | Ozawa et al. |
| 8,231,978 | B2 | | 7/2012 | Busch et al. |
| 2002/0151610 | A1 | * | 10/2002 | Hrivnak ................. C08J 9/0066 521/85 |
| 2002/0156139 | A1 | * | 10/2002 | Hrivnak ................. C08J 9/0066 521/85 |
| 2004/0242803 | A1 | * | 12/2004 | Ohme ..................... C08L 67/04 525/400 |
| 2005/0008815 | A1 | * | 1/2005 | Sukigara et al. ................. 428/98 |
| 2005/0112351 | A1 | * | 5/2005 | Laney et al. ................ 428/304.4 |
| 2005/0112352 | A1 | * | 5/2005 | Laney et al. ................ 428/304.4 |
| 2006/0263394 | A1 | * | 11/2006 | Oyama ................... C08L 51/006 424/400 |
| 2007/0020448 | A1 | * | 1/2007 | Hubbard et al. ........... 428/304.4 |
| 2007/0160782 | A1 | * | 7/2007 | Yatsuzuka et al. .......... 428/34.2 |
| 2008/0044650 | A1 | * | 2/2008 | Sukigara et al. ............. 428/338 |
| 2009/0008812 | A1 | * | 1/2009 | Kirjavainen ............ B29C 44/20 264/51 |
| 2009/0169844 | A1 | * | 7/2009 | Yamamura et al. .......... 428/213 |
| 2009/0311544 | A1 | * | 12/2009 | Lee et al. ...................... 428/458 |
| 2010/0104882 | A1 | * | 4/2010 | Yamamura et al. .......... 428/480 |
| 2010/0209694 | A1 | * | 8/2010 | Aoyama et al. ........... 428/317.9 |
| 2010/0258977 | A1 | * | 10/2010 | Sakurai et al. ............... 264/291 |
| 2011/0118395 | A1 | * | 5/2011 | Kiuchi et al. ................ 524/116 |
| 2011/0124779 | A1 | * | 5/2011 | Whitehouse ................ C08J 3/20 524/101 |
| 2011/0196077 | A1 | * | 8/2011 | Suwa .................... C08K 5/5317 524/132 |
| 2012/0141766 | A1 | | 6/2012 | Paulino et al. |

FOREIGN PATENT DOCUMENTS

| | | | |
|---|---|---|---|
| JP | 2010-001338 | * | 1/2010 |
| WO | WO-02/088230 | | 11/2002 |

* cited by examiner

BIAXIALLY ORIENTED CAVITATED POLYLACTIC ACID FILM

CROSS-REFERENCE TO RELATED APPLICATION

This application claims the benefit of U.S. Provisional Application Ser. No. 61/558,344, filed Nov. 10, 2011, the entire contents of which is incorporated herein by reference.

FIELD OF THE INVENTION

This invention relates to a multi-layer biaxially oriented polylactic acid (BOPLA) film with a novel formulation that exhibits lower density and optical properties, but improved tensile properties, and methods of making such films.

BACKGROUND OF THE INVENTION

Biaxially oriented polypropylene films (BOPP) used for packaging, decorative, and label applications often perform multiple functions. In a lamination they can provide printability, transparent or matte appearance, or slip properties. They sometimes provide a surface suitable for receiving organic or inorganic coatings for gas and moisture barrier properties, provide a heat sealable layer for bag forming and sealing, or a layer that is suitable for receiving an adhesive either by coating or laminating.

However, in recent years, interest in "greener" packaging has been strongly developing. Packaging materials based on biologically derived polymers are increasing due to concerns with renewable resources, raw materials, and greenhouse gases. Bio-based polymers are believed—once fully scaled-up—to help reduce reliance on petroleum, reduce production of greenhouse gases, and can be biodegradable as well. Bio-based polymers such as polylactic acid (PLA)—which is currently derived from corn starch (but can be derived from other plant sugars) and thus, can be considered to be derived from a renewable resource—is one of the more popular and commercially available materials available for packaging film applications. Other bio-based polymers scaling up are PHAs—polyhydroxy alkanoates—which are also of commercial interest.

For such a bio-based polymer to be fit-for-use for many snack food packaging applications, it is desirable that the bio-based polymer film match as many of the attributes possible that BOPP is well-known for, such as heat sealability, printability, controlled COF, metallizability, barrier properties, etc. A disadvantage that PLA films have in comparison to PP films is due to the higher density of PLA vs. PP: about 1.24 for PLA vs. 0.905 for PP. This means that a BOPLA film of the same thickness as a BOPP film will have a much lower yield—a term commonly used in the industry denoting a unit area per unit weight of the film—than the BOPP film. For example, a 20 μm (80 G) thick BOPLA film would have a yield of about 28,000 in$^2$/lb (39.8 m$^2$/kg) vs. a 20 μm (80 G) BOPP films yield of about 38,300 in$^2$/lb (54.5 m$^2$/kg). The difference in yield is due to the density difference between PLA and PP resin. Thus, this significantly reduced yield for BOPLA for a given film thickness makes BOPLA films much more costly to use when replacing BOPP film applications. Moreover, the cost of PLA resin is higher than PP to begin with. At the time of this writing, PLA resin is about 35-50% higher in cost.

One way to make BOPLA films more cost-competitive relative to BOPP films is to reduce the density of the BOPLA film which then improves its yield. One way to reduce density is via cavitation of the BOPLA film. However, the choice of cavitating agent can make an effect on film cost and density as well. Some mineral-based cavitating agents such as CaCO$_3$ or talc has a higher density (about 2.7-2.8 for calcium carbonate and 2.75 for talc) than that of PLA, so adding CaCO$_3$ or other mineral cavitators to the PLA film can offset the density reduction obtained by said cavitation. Moreover, due to the typically large variation in particle sizes, the voids or cavities produced around the mineral cavitating agent are often very large, irregularly shaped, and can adversely affect the mechanical and/or tear resistance properties of the film.

In addition, opaque or white opaque films are often desirable for certain packaging applications for aesthetic reasons. Such films provide a different appearance to the inside of the package when opened by the consumer (white look). A high opacity is also usually desirable so as to provide hiding power over the product, printing, or other laminate films; light or UV protection; or brighter white appearance.

EP Patent 1 385 899 B1 describes a sequentially biaxially oriented film composed of at least one layer including an aliphatic hydroxycarboxylic acid (i.e. PLA) and 0.5-30 wt. % of a cyclic olefin copolymer (COC) having a Tg of 70-270° C. with the film having vacuole-like cavities and a density of less than 1.25 g/cm$^3$. However, the use of COC adds cost to the film as this material is expensive to use.

U.S. patent application Ser. No. 12/444,420 describes an opaque simultaneously biaxially oriented PLA film composed of at least one layer including a polymer of hydroxycarboxylic acid (i.e. PLA) and 0.5-30 wt. % of a cyclic olefin copolymer (COC) having a Tg of 70-270° C. This application states that COC polymers are "the only known effective vacuole formers in biaxially oriented PLA films." Moreover, the use of COC as a cavitating agent adds cost to the film as COC materials are expensive and costly to begin with.

U.S. patent application Ser. No. 12/483,072 describes a method to cavitate biaxially oriented PLA films using inorganic particles and low transverse orientation temperatures. The cavities and voids in using this approach can be very large and can have a negative effect on the film's mechanical strength and tensile properties.

U.S. patent application Ser. No. 13/313,567 describes the use of polystyrene as a cavitating agent for biaxially oriented PLA films which helps reduce the overall density of said film.

U.S. Pat. No. 7,531,585 B2 describes the composition and use of metal salt-phosphorous compounds for use as nucleating agents in PLA resin. These compounds have been found to be effective in improving crystallization speed and finer dispersion of crystal sizes. However, there is no contemplation of using these materials as cavitating agents to produce cavitated PLA films.

SUMMARY OF THE INVENTION

Described are methods for achieving improved opacity and film yield of a PLA-based oriented film using a polymeric cavitating agent. The compostability and degradability features of the film and other desirable mechanical properties do not need to be sacrificed. By keeping the amount of cavitating agent as a minor component of the film, compostability or degradability properties can be maintained. The film can also retain a high degree of sustainably-sourced materials.

The inventors have developed alternate cavitating agents to address the above issues of making opaque cavitated BOPLA films, either by sequential or simultaneous orientation, and reduce the cost of such cavitated BOPLA film. A solution that utilizes phosphonic metal salt compounds and processing conditions to develop finer, well-dispersed voids that lower the density of the PLA film while maintaining superior tensile and mechanical properties versus other types of inorganic or polymeric cavitating agents has been found. The amount of phosphonic metal salt cavitating agent has also been found to be a more efficient cavitating agent than inorganic or polymeric cavitating agents, in that less of the active cavitating agent needs to be used to achieve similar reductions in density and increased opacity. Formulations that accomplish this goal as well as maintaining the biodegradability of the BOPLA film are described. This formulation may also be used as part of a metallized opaque BOPLA film.

One embodiment is a multi-layer laminate film including a first layer of a heat sealable resin including an amorphous PLA resin and a second layer including a substantially crystalline PLA resin-containing blend on one side of said sealable amorphous PLA layer. This second crystalline PLA resin-containing blend layer could be considered a core or base layer to provide the bulk strength of the laminate film. The second PLA core layer includes a blend of crystalline PLA homopolymer combined with an amount of a masterbatch of zinc salt of phenylphosphoric acid that acts as a cavitating agent to achieve a cavitated white opaque appearance and density reduction of the PLA film. An optional amount of ethylene-acrylate copolymer can also be added to the core layer at about 2-10 wt. % of the core layer that acts as a processing aid to enable high transverse orientation rates of 8.0-11.0 times the original width. The second PLA core layer also could optionally include inorganic antiblock particles of suitable size, selected from amorphous silicas, aluminosilicates, sodium calcium aluminum silicates, crosslinked silicone polymers, and/or polymethylmethacrylates. Suitable amounts range from 0.03-5.0% by weight of the core layer and typical particle sizes of 3.0-6.0 µm in diameter. Such antiblock particles function to control coefficient of friction properties, enable web-handling, and prevent blocking of the film. The second PLA core layer may also include an optional amount of amorphous PLA blended with the crystalline PLA.

The first heat sealable layer includes an amorphous PLA resin which provides heat sealable properties to the laminate and also may include various additives such as antiblock particles to allow for easier film handling. Furthermore, the laminate could further include a third PLA resin-containing layer on the second PLA resin-containing core layer opposite the side with the amorphous PLA sealable layer for use as a printing layer or metal receiving layer or coating receiving layer. This third layer of this laminate can include either an amorphous PLA or a crystalline PLA, or blends thereof.

Preferably, the second PLA resin-containing core layer includes a crystalline polylactic acid homopolymer of about 90-100 wt. % L-lactic acid units (or 0-10 wt. % D-lactic acid units) combined with an amount of zinc salt of phenylphosphoric acid in the amount of about 0.10-10.0 wt. % of this layer that acts as a cavitating agent to achieve a cavitated white opaque appearance and density reduction of the PLA film. An optional amount of amorphous PLA may also be blended in with the crystalline PLA from 0-48 wt. % of the core layer. The amorphous PLA is also based on L-lactic acid units but has greater than 10 wt. % D-lactic acid units and/or meso-lactide units (which includes one each of L and D lactic acid residuals). An optional amount of ethylene-acrylate copolymer can also be added to the core layer at about 2-10 wt. % of the core layer as a process aid for orientation, particularly transverse orientation. Optionally added to the core layer are antiblock particles of suitable size, selected from amorphous silicas, aluminosilicates, sodium calcium aluminum silicates, crosslinked silicone polymers, and/or polymethylmethacrylates to control coefficient of friction (COF) properties. Suitable amounts range from 0.03-5.0% by weight of the core layer, preferably 0.05-0.50 wt. % (500-5000 ppm) and typical particle sizes of 3.0-6.0 µm in diameter. Migratory slip additives may also be used to control COF properties such as fatty amides (e.g. erucamide, stearamide, oleamide, etc.) or silicone oils ranging from low molecular weight oils to ultra-high molecular weight gels. Suitable amounts of slip additives to use can range from 300 ppm to 10,000 ppm of the layer.

Preferably, the first PLA heat sealable resin-containing layer includes an amorphous PLA of greater than 10 wt. % D-lactic acid units. This first heat sealable amorphous PLA resin-containing layer can also include an antiblock component selected from amorphous silicas, aluminosilicates, sodium calcium aluminum silicates, crosslinked silicone polymers, and polymethylmethacrylates to aid in machinability and winding and to lower coefficient of friction (COF) properties. Suitable amounts range from 0.03-0.5% by weight of the heat sealable layer and typical particle sizes of 3.0-6.0 µm in diameter, depending on the final thickness of this layer. Migratory slip additives may also be used to control COF properties such as fatty amides (e.g. erucamide, stearamide, oleamide, etc.) or silicone oils ranging from low molecular weight oils to ultra-high molecular weight gels. Suitable amounts of slip additives to use can range from 300 ppm to 10,000 ppm of the layer.

Another embodiment could have this first PLA resin-containing layer include a non-heat-sealable amorphous PLA such as a crystalline PLA resin similar to that used in the second PLA resin-containing core layer. In addition, various blends of amorphous and crystalline PLA can be used at similar ratios as described for the core layer. In the case that a crystalline PLA is used or a blend including crystalline PLA, an optional amount of the ethylene-acrylate copolymer process aid could be used, again in the amount of 2-10 wt. % of this layer to enable transverse orientation at high rates. Preferably, this layer will also contain antiblock particles selected from amorphous silicas, aluminosilicates, sodium calcium aluminum silicates, crosslinked silicone polymers, and polymethylmethacrylates to control COF properties and aid in machinability and winding. Suitable amounts range from 0.03-0.5% by weight of the core layer and typical particle sizes of 3.0-6.0 µm in diameter, depending on the final thickness of this layer. Migratory slip additives may also be used to control COF properties such as fatty amides (e.g. erucamide, stearamide, oleamide, etc.) or silicone oils ranging from low molecular weight oils to ultra-high molecular weight gels, or blends of fatty amides and silicone oil-based materials. Suitable amounts of slip additives to use can range from 300 ppm to 10,000 ppm of the layer. An optional amount of a zinc salt of phenylphosphoric acid in the amount of about 0.10-10.0 wt. % can be added to this layer and acts as a cavitating agent to achieve a cavitated white opaque appearance and density reduction of the PLA film.

In yet another embodiment, the second PLA resin-containing core layer could be extruded by itself as a single layer only. As mentioned previously, this layer includes a crystalline polylactic acid homopolymer of about 90-100 wt. % L-lactic acid units (or 0-10 wt. % D-lactic acid units)

combined with an amount of a zinc salt of phenylphosphoric acid in the amount of about 0.1-10.0 wt. % of this layer that acts as a cavitating agent to achieve a cavitated white opaque appearance and density reduction of the PLA film. An optional amount of amorphous PLA may also be blended in with the crystalline PLA from 0-48 wt. % of the core layer. The amorphous PLA is also based on L-lactic acid units but has greater than 10 wt. % D-lactic acid units and/or meso-lactide units (which includes one each of L and D lactic acid residuals). An optional amount of ethylene-acrylate copolymer can also be added to the core layer at about 2-10 wt. % of the core layer as a process aid for orientation, particularly transverse orientation. Optionally added to the core layer are antiblock particles of suitable size, selected from amorphous silicas, aluminosilicates, sodium calcium aluminum silicates, crosslinked silicone polymers, and/or polymethylmethacrylates to control coefficient of friction (COF) properties. Suitable amounts range from 0.03-5.0% by weight of the core layer, preferably 0.05-0.50 wt. %, and typical particle sizes of 3.0-6.0 μm in diameter. Migratory slip additives may also be used to control COF properties such as fatty amides (e.g. erucamide, stearamide, oleamide, etc.) or silicone oils ranging from low molecular weight oils to ultra-high molecular weight gels. Suitable amounts of slip additives to use can range from 300 ppm to 10,000 ppm of the layer.

In the case where the above embodiments are to be used as a substrate for vacuum deposition metallizing, it is recommended that migratory slip additives not be used as these types of materials may adversely affect the metal adhesion or metallized gas barrier properties of the metallized BOPLA film. It is thought that as the hot metal vapor condenses on the film substrate, such fatty amides or silicone oils on the surface of the film could vaporize and cause pin-holing of the metal-deposited layer, thus compromising gas barrier properties. Thus, only non-migratory antiblock materials should be used to control COF and web-handling.

In the case where the above embodiments are to be used as a printing film, it may be advisable to avoid the use of silicone oils, in particular low molecular weight oils, as these may interfere with the print quality of certain ink systems used in process printing applications. However, this depends greatly upon the ink system and printing process used.

For these film embodiments described above, it is preferable to discharge-treat one side of the film. For the multi-layer film embodiments, it is preferable to discharge-treat the side opposite the heat sealable first layer for lamination, metallizing, printing, or coating. In the case of a 2-layer laminate structure wherein the amorphous PLA sealable layer is contiguous with a cavitated crystalline PLA core layer, it is preferable to discharge-treat the side of the core layer opposite the sealable layer for purposes of laminating, printing, metallizing, coating, etc. In the case of a 3-layer laminate structure, it is preferable to discharge-treat the side of the third layer which is contiguous to the side of the core layer opposite the heat sealable first layer. This third layer, as mentioned previously, is often formulated with materials that are conducive to receiving printing inks, metallizing, adhesives, or coatings. In the case of a single layer film, either or both sides of the film can be discharge-treated as desired.

Discharge-treatment in the above embodiments can be accomplished by several means, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ to the exclusion of $O_2$. The laminate film embodiments could further include a vacuum-deposited metal layer on the discharge-treated layer's surface. Preferably, the metal layer has a thickness of about 5 to 100 nm, has an optical density of about 1.5 to 5.0, and includes aluminum, although other metals can be contemplated such as titanium, vanadium, chromium, manganese, iron, cobalt, nickel, copper, zinc, gold, or palladium, or alloys or blends thereof.

In some embodiments, the laminate film is produced via coextrusion of the heat sealable layer and the blended core layer and other layers if desired, through a compositing die whereupon the molten multilayer film structure is quenched upon a chilled casting roll system or casting roll and water bath system and subsequently oriented in the machine and/or transverse direction into an oriented multi-layer film. Machine direction orientation rate is typically 2.0-3.0× and transverse direction orientation—with the use of the ethylene-acrylate impact modifier process aid—is typically 8.0-11.0×. Otherwise, without the ethylene-acrylate impact modifier process aid, transverse direction orientation may be limited to a lower rate, typically 3.0-6.0×. Heat setting conditions in the TDO oven is also critical to minimize thermal shrinkage effects.

In some embodiments, a multi-layer BOPLA film may be made using a 1.5-meter wide sequential orientation line process via coextrusion through a die. The film may be cast on a chill drum using an electrostatic pinner, oriented in the machine direction through a series of heated and differentially sped rolls, followed by transverse direction stretching in a tenter oven. The multilayer coextruded laminate sheet may be coextruded at processing temperatures of ca. 170° C. to 230° C. through a die and cast onto a cooling drum whose surface temperature is controlled between 15° C. and 26° C. to solidify the non-oriented laminate sheet at a casting speed of about 13-17 mpm. The non-oriented laminate sheet may be stretched in the longitudinal direction at about 60° C. to 70° C. at a stretching ratio of about 2 to about 3 times the original length and the resulting stretched sheet is annealed at about 45° C. to 55° C. to obtain a uniaxially oriented laminate sheet. The uniaxially oriented laminate sheet may be introduced into a tenter at a linespeed of ca. 40 to 60 mpm and preliminarily heated between about 65° C. and 75° C., and stretched in the transverse direction at about 75° C. to 90° C. at a stretching ratio of about 3-10 times the original width and then heat-set or annealed at about 90° C. to 135° C. to reduce internal stresses due to the orientation and minimize shrinkage and give a relatively thermally stable biaxially oriented sheet.

To enable the cavitation process, it is preferable to transversely stretch the laminate film at a relatively low temperature, preferably 75-80° C. for the given linespeed. Transverse direction orientation rate is preferably 3-10 times, more preferably 6-10 times using the optional ethylene-acrylate process aid or, if not using the processing aid, more preferably at 4-6 times. To render a film that is more opaque in appearance, it is preferable to increase the machine direction orientation, preferably about 3.0 times the original length. To render the film less opaque in appearance, it is preferable to decrease the machine direction orientation, preferably about 2.4 times the original length.

All these embodiments can also be metallized via vapor-deposition, preferably a vapor-deposited aluminum layer, with an optical density of at least about 1.5, preferably with an optical density of about 2.0 to 4.0, and even more preferably between 2.3 and 3.2.

Optionally, an additional third layer specifically formulated for metallizing to provide adequate metal adhesion, metal gloss, and gas barrier properties can be disposed on the second PLA resin-containing core layer, opposite the side with the heat sealable layer. Additionally, this additional layer's surface may also be modified with a discharge treatment to make it suitable for metallizing, laminating, printing, or converter applied adhesives or other coatings. It can also be contemplated to add a gas barrier layer contiguously attached to one side of the multi-layer film which can also then act as the metal-receiving layer. Such a gas barrier layer can improve the gas and moisture transmission rate of the cavitated PLA film. Gas barrier layers can include, but are not limited to: ethylene vinyl alcohols, polyvinyl alcohols, polyvinyl amines, polyhydroxyaminoethers, amorphous copolyesters, or blends thereof.

In some embodiments, a film may include a cavitated biaxially oriented layer comprising polylactic acid and a metal salt of a phosphorous compound. The metal salt of a phosphorous compound may be included in amount of about 0.1 to 10 wt. % of the layer comprising polylactic acid. The cavitated biaxially oriented layer comprising polylactic acid may have a plurality of voids and cavities and a density of less than 1.20 g/cm$^3$. The metal salt of a phosphorous compound may be a zinc salt, and the phosphorous compound may be a phenylphosphonic acid. In some embodiments, the metal salt of a phosphorous compound is a zinc salt of phenylphosphonic acid.

The film may have a white opaque appearance and a haze of 40 to 100%. The film may have a machine direction (MD) tensile strength of at least 15 kg/mm$^2$ and a transverse direction (TD) tensile strength of at least 25 kg/mm$^2$. The film may have an elongation to break of at least 150% in the machine direction (MD) and at least about 70% in the transverse direction (TD).

The film may further include a metal layer on one side of the cavitated biaxially oriented layer comprising polylactic acid. The metal layer may have an optical density of 2.0-4.0, and may include, for example, aluminum.

The metallized film may have an oxygen gas barrier of less than 46.5 cc/m$^2$/day and a moisture vapor barrier of less than 5 g/m$^2$/day. More preferably, the metallized film has an oxygen gas barrier of less than 30 cc/m$^2$/day and a moisture vapor barrier of less than 2.0 g/m$^2$/day.

The cavitated biaxially oriented layer may include crystalline polylactic acid with 90-100% L-lactic acid units. The film may further include a heat seal layer on a surface of the cavitated biaxially oriented layer comprising polylactic acid. The heat seal layer may include polylactic acid.

The cavitated biaxially oriented layer may further include an ethylene-acrylate modifier. The film may be oriented at least 2× in the machine direction and at least 3×, more preferably at least 8× in the transverse direction.

Additional advantages of this invention will become readily apparent to those skilled in the art from the following detailed description, wherein only the preferred embodiments of this invention are shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

BRIEF DESCRIPTION OF THE DRAWINGS

The novel features which are characteristic of the present invention are set forth in the appended claims and examples. However, the invention's preferred embodiments, together with further objects and attendant advantages, will be best understood by reference to the following detailed description and Examples taken in connection with the accompanying figures in which:

DETAILED DESCRIPTION OF THE INVENTION

Figure 1:
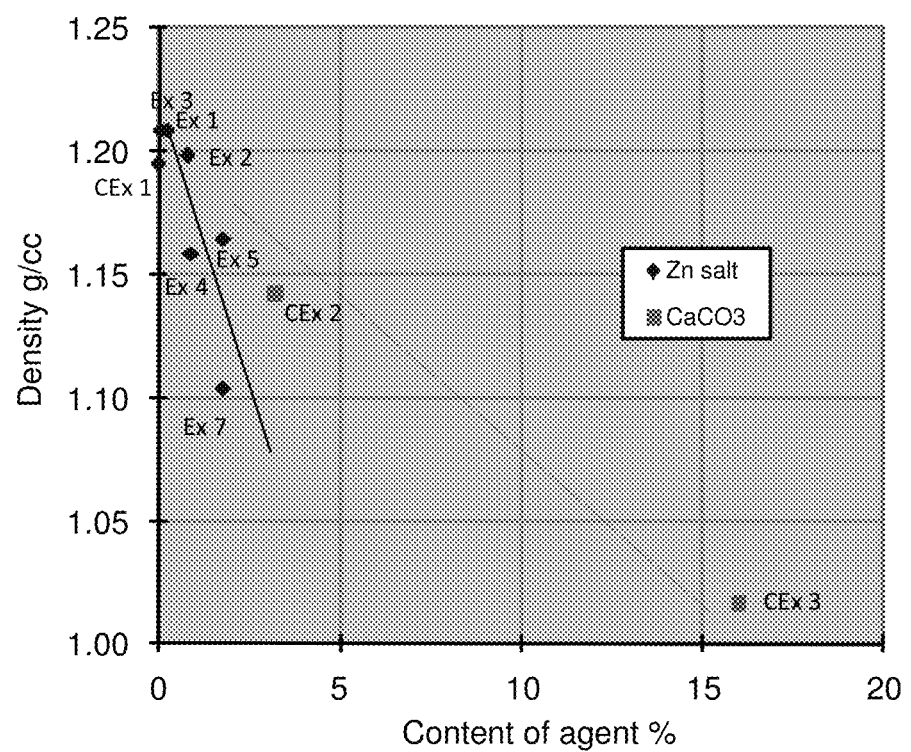
FIG. 1 is a graph of density v. wt. % of cavitating agent for selected Examples and Comparative Examples using zinc salt and calcium carbonate cavitating agents.

Described are multi-layer biaxially oriented polylactic acid (BOPLA) films with a novel formulation that exhibits lower density and optical properties, but improved tensile properties, and methods of making such films. This improved cavitated formulation includes a blend of crystalline and amorphous PLA resin with an amount of a metal salt phosphorous-containing compound nucleating agent to achieve a cavitated white opaque PLA-based film that still exhibits degradability and compostability with lower density, but improved mechanical strength.

In one embodiment, the laminate film includes a 2-layer coextruded film of: A PLA resin core layer including a crystalline polylactic acid polymer combined with an amount of a zinc salt of phenylphosphoric acid in the amount of about 0.10-10.0 wt. % of this layer that acts as a cavitating agent to achieve a cavitated white opaque appearance and density reduction of the PLA film, optionally blended with an amount of an amorphous PLA polymer, an optional amount of ethylene-acrylate copolymer, and an optional amount of inorganic antiblock particle; and a heat sealable layer including an amorphous polylactic acid polymer; and the side of the crystalline PLA core layer blend opposite the sealable resin layer is discharge-treated.

Another embodiment of a laminate film includes a similar construction as above, except that a third PLA skin layer may be disposed on the side of the crystalline PLA/zinc salt core layer blend opposite the heat sealable amorphous PLA layer. This third PLA layer can include either crystalline PLA resin or amorphous PLA resin or blends thereof. In the case where crystalline PLA resin is part of this layer's formulation, an amount of ethylene-acrylate copolymer can be incorporated as in the core layer formulation. An optional amount of a zinc salt of phenylphosphoric acid in the amount of about 0.10-10.0 wt. % can be added to this layer to act as a cavitating agent to achieve a cavitated white opaque appearance and density reduction of the PLA film. Generally, it is desirable to discharge-treat the exposed surface of this third layer in order to provide further functionality as a surface to receive metallization, printing, coating, or laminating adhesives.

The polylactic acid resin core layer may be a crystalline polylactic acid of a specific optical isomer content and can be biaxially oriented. As described in U.S. Pat. No. 6,005,068, lactic acid has two optical isomers: L-lactic acid (also known as (S)-lactic acid) and D-lactic acid (also known as (R)-lactic acid). Three forms of lactide can be derived from these lactic acid isomers: L,L-lactide (also known as L-lactide) and which includes two L-lactic acid residuals; D,D-lactide (also known as D-lactide) and which includes two D-lactic acid residuals; and meso-lactide which includes one each of L and D-lactic acid residuals. The degree of crystallinity is determined by relatively long sequences of a particular residual, either long sequences of L or of D-lactic acid. The length of interrupting sequences is important for establishing the degree of crystallinity (or amorphous) and other polymer features such as crystallization rate, melting point, or melt processability. The crystalline polylactic acid resin is preferably one comprised primarily of the L-lactide isomer with minority amounts of either D-lactide or meso-lactide or combinations of D-lactide and meso-lactide. Preferably, the minority amount is D-lactide and the amount of D-lactide is 10 wt. % or less of the crystalline PLA polymer. More preferably, the amount of D-lactide is less than about 5 wt. %, and even more preferably, less than about 2 wt. %. Suitable examples of crystalline PLA are Natureworks® Ingeo™ 4042D and 4032D. These resins have relative viscosity of about 3.9-4.1, a melting point of about 165-173° C., a crystallization temperature of about 100-120° C., a glass transition temperature of about 55-62° C., a D-lactide content of about 4.25 wt. % and 1.40 wt. % respectively, density of about 1.25 g/cm³, and a maximum residual lactide in the polylactide polymer of about 0.30% as determined by gas chromotography. Molecular weight M, is typically about 200,000; typically about 100,000; polydispersity about 2.0. Natureworks® 4032D is the more preferred crystalline PLA resin, being more crystalline than 4042D and more suitable for high heat biaxial orientation conditions. In addition, the 4042D PLA grade contains about 1000 ppm of erucamide and for some applications, particularly for gas barrier metallizing, may not be suitable.

The core resin layer is typically 8 μm to 100 μm in thickness after biaxial orientation, preferably between 10 μm and 50 μm, and more preferably between about 15 μm and 25 μm in thickness. A preferred embodiment is to use the higher crystalline, higher L-lactide content PLA (lower wt. % D-lactide of about 1.40) such as Natureworks® 4032D.

The core layer can also optionally include an amount of amorphous PLA resin to improve further extrusion processing and oriented film processing. The addition of amorphous PLA in the core layer helps to lower extrusion polymer pressure and in terms of film manufacturing, helps to reduce or slow crystallization rate of the newly oriented film. This aids in the orientation of the PLA film in both MD and TD and helps reduce defects such as uneven stretch marks. It also helps with the slitting of the biaxially oriented film at the edge-trimming section of the line by reducing the brittleness of the edge trim and reducing the instances of edge trim breaks which can be an obstacle to good productivity. The amorphous PLA is preferably based on a L-lactide isomer with D-lactide content of greater than 10 wt. %. A suitable amorphous PLA to use is Natureworks® Ingeo™ 4060D grade. This resin has a relative viscosity of about 3.25-3.75, $T_g$ of about 52-58° C., seal initiation temperature of about 80° C., density of about 1.24 g/cm³, a D-lactide content of about 12 wt. %, and a maximum residual lactide in the polylactide polymer of about 0.30% as determined by gas chromotography. Molecular weight $M_w$ is about 180,000. Suitable amounts of amorphous PLA to use in the core are concentrations of up to about 48 wt. % of the core layer, preferably up to about 30 wt. % of the core layer, and even more preferably about 15-20 wt. % of the core layer. It should be noted, however, that too much amorphous PLA in the core layer (e.g. 50% or greater) can cause high thermal shrinkage rates after biaxial orientation and in spite of heat-setting conditions in the transverse orientation oven to make a thermally stable film. A thermally, dimensionally stable film is important if the substrate is to be used as a metallizing, printing, coating, or laminating substrate. (However, if the BOPLA is desired as a shrinkable film, this composition and appropriate processing conditions might be suitable.)

An optional component is blending into the core layer a minority amount of ethylene-acrylate copolymer as a processing aid in orientation, in particular, to enable high transverse orientation rates (TDX) similar to that used in BOPP orientation (e.g. 8-10 TDX). Ethylene-acrylates are of the general chemical formula of $CH_2$=$C(R^1)CO_2R^2$ where $R^1$ can be hydrogen or an alkyl group of 1-8 carbon atoms and $R^2$ is an alkyl group of 1-8 carbon atoms. Examples of ethylene-acrylate copolymers that may be used are those based on ethylene-acrylate, ethylene-methacrylate, ethylene-n-butyl acrylate-glycidyl methacrylate, ethylene-glycidyl methacrylate, ethylene-butyl-acrylate, ethylene acrylic esters, or blends thereof. Ethylene vinyl acetate (EVA) and ethylene methacrylate (EMA) can also be contemplated. Other similar materials may also be contemplated. As described in U.S. Pat. No. 7,354,973, suitable compositions of the ethylene-acrylate copolymers can be about 20-95 wt. % ethylene content copolymerized with about 3-70 wt. % n-butyl acrylate and about 0.5-25 wt. % glycidyl methacrylate monomers. A particularly suitable ethylene-acrylate copolymer of this type is one produced by E. I. DuPont de Nemours and Company Packaging and Industrial Polymers Biomax® Strong 120. This additive has a density of about 0.94 g/cm³, a melt flow rate of about 12 g/10 minutes at 190° C./2.16 kg weight, a melting point of about 72° C., and a glass transition temperature of about −55° C. Other suitable ethylene-acrylate copolymer impact modifiers commercially available are: DuPont Elvaloy® PTW, Rohm & Haas, Inc. BPM500, and Arkema, Inc. Biostrength® 130.

Suitable amounts of ethylene-acrylate copolymer to be blended in the crystalline PLA-comprising core layer are from 2-10 wt. % of the core layer, preferably 2-7 wt. % and more preferably, 3-5 wt. %. Blending into the core layer can be done most economically by dry-blending the respective resin pellets; it is contemplated that more aggressive blending such as melt-compounding via single-screw or twin-screw can result in better dispersion of the ethylene-acrylate copolymer throughout the PLA matrix.

To obtain the white opaque cavitated appearance of the oriented PLA film, an active amount of about 0.1-10.0 wt. % of zinc salt of phenylphosphonic acid is added to the core layer or to both core and the non-sealable layer of the laminate film, preferably 0.3-2.0 wt. % of the respective layers. A masterbatch of 30 wt. % zinc salt of phenylphosphonic acid and 70 wt. % PLA—manufactured by Nissan Chemical Industries Ltd. grade Ecopromote® MB-N3S30—was used. The phenylphosphonic acid, zinc salt specific gravity was 2.0; solubility was 7.2 mg/L $H_2O$; decomposition temperature was greater than 500° C.; and the average particle size was nominal 1.9 μm.

An amount of an inorganic antiblock agent can be optionally added in the amount of 300-50,000 ppm (0.03-5.0 wt. %) of the core resin layer, preferably 500-5000 ppm, and even more preferably, 1000-2000 ppm. Preferred types of antiblock are spherical sodium aluminum calcium silicates or an amorphous silica of nominal 6 μm average particle diameter, but other suitable inorganic antiblocks can be used including crosslinked silicone polymer or polymethylmethacrylate, and ranging in size from 2 μm to 6 μm. Particularly preferred is spherical sodium aluminum calcium silicate of nominal 2.0 μm diameter size manufactured by Mizusawa Industrial Chemicals under the tradename Silton® JC-20. A PLA antiblock masterbatch (aka "PLA1212-02") of 2 wt. % nominal 2.0 μm average particle size sodium calcium aluminum silicate Misuzawa Silton® JC-20 in a crystalline polylactic acid carrier resin, Natureworks® PLA 4032D, was used.

In an embodiment of a 2-layer coextruded multilayer film, the core resin layer can be surface treated on the side opposite the skin layer with an electrical corona-discharge treatment method, flame treatment, atmospheric plasma, or corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide is particularly preferred. This method results in a treated surface that includes nitrogen-bearing functional groups, preferably at least 0.3 atomic % or more, and more preferably, at least 0.5 atomic % or more. This treated core layer is then well suited for subsequent purposes of metallizing, printing, coating, or laminating.

In this embodiment of a 2-layer laminate film, it is also possible to add optional amounts of migratory slip agents such as fatty amides and/or silicone oils in the core layer to aid further with controlling coefficient of friction (COF) and web handling issues. Suitable types of fatty amides are those such as stearamide or erucamide and similar types, in amounts of 100-1000 ppm of the core. Preferably, stearamide is used at 400-600 ppm of the core layer. A suitable silicone oil that can be used is a low molecular weight oil of 350 centistokes which blooms to the surface readily at a loading of 400-600 ppm of the core layer. However, if the films are to be used for metallizing or high definition process printing, it is recommended that the use of migratory slip additives be avoided in order to maintain metallized barrier properties and adhesion or to maintain high printing quality in terms of ink adhesion and reduced ink dot gain. In this case, it is recommended that coefficient of friction control and web handling is resolved using inorganic antiblock particles similar to those already described.

The coextruded skin layer can be a heat sealable resin layer including an amorphous polylactic acid polymer. As described earlier, the amorphous PLA is preferably based on a L-lactide isomer with D-lactide content of greater than 10 wt. %. A suitable amorphous PLA to use is Natureworks® Ingeo™ 4060D grade. This resin has a relative viscosity of about 3.25-3.75, $T_g$ of about 52-58° C., seal initiation temperature of about 80° C., density of about 1.24 g/cm$^3$, a D-lactide content of about 12 wt. %, and a maximum residual lactide in the polylactide polymer of about 0.30% as determined by gas chromotography. Molecular weight $M_w$ is about 180,000. The preferred amount to be used as a heat sealable skin layer is about 100 wt. % of the layer. It is also preferred to add an amount of inorganic antiblock to this layer to aid in web-handling, COF control, film winding, and static control, among other properties. Suitable amounts would be about 1000-5000 ppm of the heat sealable resin layer, preferably 3000-5000 ppm.

Preferred types of antiblock are spherical crosslinked silicone polymer such as Toshiba Silicone's Tospearl® grades of polymethylsilsesquioxane of nominal 2.0 and 3.0 μm sizes. Alternatively, sodium aluminum calcium silicates of nominal 2 μm in diameter can also be used (such as Mizusawa Silton® JC-20), but other suitable spherical inorganic antiblocks can be used including polymethylmethacrylate, silicas, and silicates, and ranging in size from 2 μm to 6 μm. A PLA antiblock masterbatch (aka "PLA10J2-05") of 5 wt. % nominal 2.0 μm average particle size sodium calcium aluminum silicate Misuzawa Silton® JC-20 in an amorphous polylactic acid carrier resin, Natureworks® PLA 4060D, was used. Migratory slip agents such as fatty amides or silicone oils can also be optionally added to the heat seal resin layer of types and quantities mentioned previously if lower COF is desired. However, if the films are to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain.

A heat sealable resin layer can be coextruded on one side of the core layer. This heat sealable layer may have a thickness after biaxial orientation of between 0.5 and 5 μm, preferably between 1.0 and 2.0 μm. The core layer thickness can be of any desired thickness after biaxial orientation, but preferred and useful thicknesses are in the range of 10 μm to 100 μm, preferably 13.5 μm to 25 μm, and even more preferably 15.0 μm-20.0 μm. These film thicknesses, however, are considered "polyweight" thickness, i.e. the amount of polymer extruded prior to cavitation. The cavitation process increases the physical thickness due to the "lofting" effect of void formation around the cavitating particles. Thus, cavitated film thickness can and should be distinguished between "polyweight" and "cavitated" thickness. In general, cavitated thickness will be measurably and physically thicker than polyweight thickness. For example, a 20 μm polyweight PLA film can be lofted to a 27.5 μm cavitated PLA film via the voids formed around the cavitating agent. The cavitating thickness can be adjusted via processing conditions such as orientation stretching ratios, orientation preheat and stretching temperatures, amount of cavitating agent used, etc., which influences the void sizes and degree of cavitation. Generally, higher orientation ratios and lower processing temperatures will increase such "lofting"; lower orientation ratios and higher processing temperatures will decrease "lofting." (Of course, those coextruded layers which do not contain any cavitating agent, will not "loft" or cavitate.)

The coextrusion process includes a multi-layered compositing die, such as a two- or three-layer die, or a multilayer compositing feed block feeding multi extrudate layers to a single layer die. In the case of a 2-layer coextruded film, a two-layer compositing die or a combination of a 2-layer compositing feed block feeding 2 extrudate layers to a single layer die can be used. In the case of a 3-layer coextruded film, the polymer blend core layer can be sandwiched between the heat sealable resin layer and a third layer using a three-layer compositing die. One embodiment is to coextrude in only two layers with only the blended core layer and the heat sealable layer coextruded on one side of the core layer. In this case, the core layer side opposite the heat sealable layer is further modified by adding inorganic antiblock particles into the core layer itself as explained previously and can also be surface-treated via a discharge-treatment method if so desired. In a three-layer coextruded film embodiment, a third layer on the side of the core layer opposite the heat sealable layer can also be modified with antiblock particles in lieu of the core layer and also can be surface-treated via a discharge-treatment method as desired. The third layer can include any polymer typically compatible with the core layer resin such as a crystalline PLA resin, amorphous PLA resin, or blends thereof. Typically, selection of this third layer's formulation is to enhance the coextruded film's printability, appearance, metallizability, winding, laminating, sealability, or other useful characteristics. Useful thickness of this third layer after biaxial orientation can be similar to the polyweight thicknesses cited for the heat sealable skin layer, preferably 1.0-2.0 μm.

The surface opposite the heat sealable layer can be surface-treated if desired with a corona-discharge method, flame treatment, atmospheric plasma, or corona discharge in a controlled atmosphere of nitrogen, carbon dioxide, or a mixture thereof which excludes oxygen. The latter treatment method in a mixture of $CO_2$ and $N_2$ only is preferred. This method of discharge treatment results in a treated surface that includes nitrogen-bearing functional groups, preferably 0.3% or more nitrogen in atomic %, and more preferably 0.5% or more nitrogen in atomic %. This discharge-treated surface can then be metallized, printed, coated, or extrusion or adhesive laminated. Preferably, it is printed or metallized, and more preferably, metallized.

If the three-layer coextruded film embodiment is chosen, the third layer may be coextruded with the core layer opposite the heat sealable resin layer, having a polyweight thickness after biaxial orientation between 0.5 and 5 μm, preferably between 0.5 and 3 μm, and more preferably between 1.0 and 2.0 μm. A suitable material for this layer is a crystalline PLA or amorphous PLA or blends thereof, as described earlier in the description. If amorphous PLA is used, the same suitable resin grade used for the heat sealable layer may be employed (e.g. Natureworks® 4060D). If crystalline PLA is used, the same suitable grades as used for the core layer may be employed such as Natureworks® 4042D or 4032D, with the 4032D grade preferred in general. Additionally, blends of both crystalline and amorphous PLA may be contemplated for this layer, similar to previously described formulations for the core layer, but not limited to those descriptions. For example, the ratio of amorphous PLA to crystalline PLA for this third skin layer can range from 0-100 wt. % amorphous PLA and 100-0 wt. % crystalline PLA. In those embodiments in which crystalline PLA is used in the third layer, an amount of ethylene-acrylate copolymer could be used as described previously, in order to ensure the ability to transversely orient this layer at high orientation rates. Suitable amounts of ethylene-acrylate copolymer to use in this skin layer is 2-10 wt. %, preferably 2-7 wt. % and, more preferably, 3-5 wt. %. The use of various blends of amorphous and crystalline PLA in this layer may make it more suitable for printing, metallizing, coating, or laminating, and the exact ratio of the blend can be optimized for these different applications.

This third layer may also advantageously contain an anti-blocking agent and/or slip additives for good machinability and a low coefficient of friction in about 0.01-0.5% by weight of the third layer, preferably about 250-1000 ppm. Preferably, non-migratory inorganic slip and/or antiblock additives as described previously should be used to maintain gas barrier properties and metal adhesion if metallizing, or ink wetting and ink adhesion if printing.

In addition, another embodiment that can be considered is to replace the heat sealable amorphous PLA layer with a non-sealable PLA layer. In this variation, amorphous or crystalline PLA may be used, or blends thereof. In the case of making this layer non-sealable, preferably crystalline PLA should be used, either by itself or as the majority component of a blend with amorphous PLA. As discussed previously, if crystalline PLA is used for this layer, an amount of ethylene-acrylate copolymer could be used as part of this layer to aid high transverse orientation rates. Suitable amounts of ethylene-acrylate copolymer to use in this skin layer is 2-10 wt. %, preferably 2-7 wt. % and, more preferably, 3-5 wt. %. Preferably, non-migratory inorganic slip and/or antiblock additives as described previously should be used to maintain gas barrier properties and metal adhesion if metallizing, or ink wetting and ink adhesion if printing. It is also preferred to add an amount of inorganic antiblock to this layer to aid in web-handling, COF control, film winding, and static control, among other properties. Suitable amounts would be about 1000-5000 ppm of the this non-eat sealable resin layer, preferably 3000-5000 ppm. Preferred types of antiblock are spherical crosslinked silicone polymer such as Toshiba Silicone's Tospearl® grades of polymethlysilsesquioxane of nominal 2.0 and 3.0 μm sizes. Alternatively, sodium aluminum calcium silicates of nominal 2 μm in diameter can also be used (such as Mizusawa Silton® JC-20), but other suitable spherical inorganic antiblocks can be used including polymethylmethacrylate, silicas, and silicates, and ranging in size from 2 μm to 6 μm. It is often preferred to discharge-treat the exposed side of this layer so as to enable adequate adhesion and wet-out of adhesives or inks or coatings to this side. In particular, cold seal latexes can be applied to this dischargetreat surface.

The multilayer coextruded film can be made either by sequential biaxial orientation or simultaneous biaxial orientation, which are well-known processes in the art. In the case of sequential orientation, a 1.5-meter wide sequential orientation film-making line was used for the forthcoming Examples and Comparative Examples.

This invention will be better understood with reference to the following examples, which are intended to illustrate specific embodiments within the overall scope of the invention.

EXAMPLES

Multi-layer BOPLA films were made using a 1.5 m wide sequential orientation line process with a blend of Natureworks® PLA4032D, Natureworks® PLA4060D, cavitating agents (zinc salt and calcium carbonate masterbatches in PLA carrier) as core layer (B) as detailed in the Examples and Table 1; one skin layer (A) of a blend of 85 wt. % Natureworks® PLA4032D and 15 wt. % Natureworks® PLA4060D, antiblock masterbatch and optionally a zinc salt cavitating agent on one side of the core layer (B) as detailed in the Examples; and the heat sealable layer (C) with antiblock on the side of the core layer (B) opposite the skin layer (A) as detailed in Examples; via coextrusion through a die, cast on a chill drum using an electrostatic pinner, oriented in the machine direction at about 3 times through a series of heated and differentially sped rolls, followed by transverse direction stretching in a tenter oven. An optional amount of DuPont Biomax® 120 can be added to the core layer (B) in an amount of 2-4 wt. % of the core layer which acts as a process aid during transverse orientation and is recommended if transverse orientation rates are greater than about 5 times, e.g. 6× or more. (If the transverse orientation rate is 5× or less, the Biomax 120 can be omitted). In the Examples for this application, the Biomax® 120 was omitted and a lower transverse orientation ratio of about 5.0× was used.

The multilayer coextruded BOPLA film was coextruded at processing temperatures of ca. 190° C. to 215° C. through a die and cast onto a cooling drum whose surface temperature was controlled between 15° C. and 26° C. to solidify the non-oriented laminate sheet at a casting speed of about 8-13 mpm. The non-oriented laminate sheet was preheated in the machine direction orienter at about 43° C. to 63° C., stretched in the longitudinal direction at about 55° C. to 62° C. at a stretching ratio of about 3 times the original length and the resulting stretched sheet was annealed at about 24° C. to 46° C. to reduce heat shrinkage and to obtain a uniaxially oriented laminate sheet. The uniaxially oriented laminate sheet was introduced into a tenter at a line speed of ca. 24 to 60 mpm and preliminarily heated between about 65° C. and 75° C., and stretched in the transverse direction at about 80° C. to 95° C. at a stretching ratio of about 5 times the original width and then heat-set or annealed at about 100° C. to 135° C. to reduce internal stresses due to the orientation and minimize shrinkage and give a relatively thermally stable biaxially oriented sheet. TD orientation rates were adjusted by moving the transverse direction rails in or out per specified increments based on the TD infeed rail width settings and width of the incoming machine-direction oriented film. The biaxially oriented film had a total poly-weight thickness between 10 and 100 µm, preferably between 15 and 30 µm, and most preferably between 17 and 25 µm.

After biaxial orientation, the polyweight thickness of the coextruded film overall was nominal 70 G (17.5 µm); the sealant layer (C) was nominal 8 G (2.0 µm); the skin layer (A) was nominal 6 G (1.5 µm); and the core layer was nominal 56 G (14.0 µm). Main layer extruder output was adjusted to maintain finished film polyweight thickness of 70 G (17.5 µm) after orientation as needed. Sample films made with cavitating agents were extruded at the same polyweight as a nominal 70 G (17.5 µm) thick non-cavitated oriented film, but were allowed to cavitate via processing temperatures in the MD and TD orientation processes to higher thicknesses. This "lofting" effect due to cavitation will change the density and yield of the sample films. The film was heat-set or annealed in the final zone of the tenter oven to reduce internal stresses and minimize heat shrinkage of the film and maintain a dimensionally stable biaxially oriented film. The side of the core layer opposite the sealable skin layer was treated via corona discharge treatment method after orientation. The BOPLA multi-layer film was wound in roll form.

For cavitation, an amount of cavitating agent was added to the core layer (B); or into the skin layer (A); or into both layers (B) and (A) as desired. For zinc salt of phenylphosphonic acid cavitator, the zinc salt masterbatch was blended directly into the core and/or skin layer via resin blending systems which mixed the desired amount with the PLA resins. The active amount of zinc salt ranged from about 0.1-10 wt. % of the layer, and preferably, 0.3-2.0 wt. % of the core. (In terms of the 30 wt % zinc salt masterbatch used, about 0.33-33 wt. % masterbatch was blended into the layer to obtain the active zinc salt amount of 0.1-10 wt. %.)

For mineral cavitators such as calcium carbonate, the mineral masterbatch was used and blended into the core layer via the same resin blending method, and masterbatch amounts ranged from 5-30 wt. % of the core, preferably 10-20 wt. % of the core. The masterbatch carrier resin was crystalline PLA 4032D. Depending on the loading of the mineral, the active mineral ranged from 2.0-12.0 wt. % of the core layer using a 40 wt. % CaCO$_3$ masterbatch.

Without being bound by any theory, it is believed that when the inventive film is biaxially oriented, particularly at relatively low transverse orientation temperatures and certain machine direction orientation rates, cavitation occurs around the zinc salt domains within the core layer. Some work is required to develop the proper conditions to induce the required amount of cavitation to impart a white opaque cavitated appearance depending on the type and design of the film orientation line, but this can be found as a result of optimization of the respective line's process conditions. For a given cavitating agent the degree of cavitation imparts the opaque appearance of the film: at a low degree of cavitation, the film has a lower opaque appearance or even a matte appearance; at a higher degree of cavitation, the film has a higher opaque and whitish appearance due to increased number and/or size of voids. This cavitation has been observed by changes in measurement of the film's density (Table 2). As the film becomes more cavitated, its density decreases and its apparent thickness will increase due to the lofting effect of cavitation.

The sealable skin layer (C), which was comprised substantially of amorphous PLA Natureworks® PLA4060D, can also optionally include an amount of Mizusawa Silton® JC-20 2 µm antiblock masterbatch of ca. 6% by weight of layer (C) to give an amount of antiblock loading of the sealant layer of about 3000 ppm. A masterbatch was made of the JC-20 antiblock by melt-compounding about 5 wt. % JC-20 with about 95 wt. % of amorphous PLA4060D. This masterbatch was labeled "PLA10J2-05."

The skin layer (A)—which can be used as a metal receiving layer or print receiving layer or laminating layer—can be comprised substantially of Natureworks® PLA4060D amorphous PLA and can also include blends of amorphous and crystalline PLA such as Natureworks® PLA4032D. Amounts of crystalline PLA can be up to 100 wt. % of this layer (i.e. amorphous PLA can be 0-100 wt. % of the layer (A)). Preferably, the amount of crystalline and amorphous PLA can be about 85 wt. % and 15 wt. % of the skin layer, respectively. Optionally, this layer can also include an amount of antiblock or antiblock masterbatch to control COF properties and aid in web handling. Typical amounts of inorganic antiblock can be up to 1000 ppm of the metal receiving layer (A) (preferably, 300-600 ppm) and can include silicas, aluminum magnesium calcium silicates, PMMA, or crosslinked silicone polymer of nominal 1.0-6.0 µm particle size, preferably 2.0-3.0 µm particle size. A preferred embodiment is to use this layer (A) as a metal receiving layer for metallization. A masterbatch was made of the JC-20 antiblock by melt-compounding about 2 wt. % JC-20 with about 98 wt. % of crystalline PLA4032D. This masterbatch was labeled "PLA1212-02."

One embodiment is to metallize the discharge-treated surface opposite the heat sealable resin layer. The unmetallized laminate sheet is first wound in a roll. The roll is then placed in a vacuum metallizing chamber and the metal vapor-deposited on the discharge-treated metal receiving layer surface. The metal film may include titanium, vanadium, chromium, manganese, iron, cobalt, nickel, copper, zinc, aluminum, gold, or palladium, the preferred being aluminum. Metal oxides can also be contemplated, the preferred being aluminum oxide. The metal layer can have a thickness between 5 and 100 nm, preferably between 20 and 80 nm, more preferably between 30 and 60 nm; and an optical density between 1.5 and 5.0, preferably between 2.0 and 4.0, more preferably between 2.2 and 3.2. The test rolls were placed inside a vacuum chamber metallizer for vapor deposition metallization using aluminum which is well known in the art.

Optionally, prior to aluminum deposition, the film can be treated using a type of sputtering with a copper cathode at a linespeed of about 305 mpm. This treater is typically set up in the low vacuum section of the metallizer where the unwinding roll is located and the film is passed through this treater prior to entering the high vacuum section of the metallizer where the evaporation boats are located. The treater uses high voltage between the anode and cathode to produce free electrons. Oxygen gas is introduced into the treater and the free electrons combine with the oxygen gas to produce oxygen ions. Magnetic fields guide and accelerate the oxygen ions onto the copper cathode target which then emit copper ions. These copper ions are deposited onto the polylactic acid polymer substrate, creating a monolayer of copper, ca. 20 ng/m$^2$ (nanogram/sq. meter) thick. The film was then passed into the high vacuum deposition chamber of the metallizer which was metallized using aluminum to a nominal optical density target of 2.4. Optical densities for aluminum deposition can range from 2.0 to 5.0; preferably the OD range is 2.2-2.6. The metallized rolls were then slit on a film slitter and tested for oxygen and moisture gas permeability, optical density, metal adhesion, metal appearance and gloss, heat seal performance, tensile properties, thermal dimensional stability, and can be made into a laminate structure.

It can also be contemplated to add a gas barrier layer onto the cavitated film substrate prior to metallization via coextrusion, extrusion, coating, or solution coating. Such gas barrier layers can include, but are not limited to: ethylene vinyl alcohol, polyvinyl alcohol, PVdC, polyvinyl amines, polyhydroxyaminoethers, polyurethanes, styrene butadiene copolymers, acrylics, amorphous copolyesters, and blends thereof. Metallization can take place upon this gas barrier layer.

Example 1

A 3-layer PLA film was made by the process described above using a core layer (B) formulation of 1 wt. % Ecopromote® N3S30 zinc salt masterbatch, 84.15 wt. % PLA4032D and 14.85 wt. % PLA4060D of the core layer. The non-sealable layer (A) consisted of 82.88 wt. % PLA4032D, 14.62 wt. % PLA4060D, and 2.5 wt. % of JC20 antiblock PLA masterbatch PLA1212-02. The sealant layer (C) consisted of 94 wt. % PLA4060D and 6 wt. % JC-20 masterbatch PLA10J2-05.

The total polyweight thickness of this film substrate after biaxial orientation was ca. 70 G or 0.70 mil or 17.5 µm. The thickness of the respective metal receiving layer after biaxial orientation was ca. 6 G (1.5 µm). The thickness of the respective heat sealable resin layer after biaxial orientation was ca. 8 G (2.0 µm). The thickness of the core layer after biaxial orientation was ca. 56 G (14.0 µm). The skin layers and the core layer were melt coextruded together through a flat die to be cast on a chill drum using an electrostatic pinner. The formed cast sheet was passed through a machine-direction orienter to stretch in the machine direction (MD) at ca. 3.0× stretch ratio in the longitudinal direction. This was followed by transverse direction (TD) stretching at ca. 5.0× stretch ratio in the tenter oven at a stretching temperature of about 175° F. (79.4° C.) and heat-set or annealed to reduce film shrinkage effects at ca. 240° F. (115° C.). The resultant biaxially oriented film was subsequently discharge-treated on the skin layer's surface opposite the heat sealable skin layer via corona treatment. The film was then wound up in roll form.

Example 2

A process similar to Example 1 was repeated except that the core layer (B) blend was changed to: 3.3 wt. % Ecopromote® N3S30 zinc salt masterbatch, PLA 4032D 82.2 wt. %, and PLA 4060D 14.5 wt. %.

Example 3

A 3-layer PLA film was made by the process described above using a core layer (B) formulation of 0 wt. % Ecopromote® N3S30 zinc salt masterbatch, 85 wt. % PLA4032D and 15 wt. % PLA4060D of the core layer. The non-sealable layer (A) consisted of: 3.3 wt. % of Ecopromote® N3S30 zinc salt masterbatch, 80.1 wt. % PLA4032D, 14.1 wt. % PLA4060D, and 2.5 wt. % of JC20 antiblock PLA masterbatch. The sealant layer (C) consisted of 94 wt. % PLA4060D and 6 wt. % JC-20 masterbatch.

Example 4

A 3-layer PLA film was made by the process described above using a core layer (B) formulation of 3.3 wt. % Ecopromote® N3S30 zinc salt masterbatch, 84.15 wt. % PLA4032D and 14.85 wt. % PLA4060D of the core layer. The non-sealable layer (A) consisted of: 3.3 wt. % of Ecopromote® N3S30 zinc salt masterbatch, 81.3 wt. % PLA4032D, 14.4 wt. % PLA4060D, and 1.0 wt. % of JC20 antiblock PLA masterbatch. The sealant layer (C) consisted of 94 wt. % PLA4060D and 6 wt. % JC-20 masterbatch.

Example 5

A 3-layer PLA film was made by the process described above using a core layer (B) formulation of 6.6 wt. % Ecopromote® N3S30 zinc salt masterbatch, 79.4 wt. % PLA4032D and 14.0 wt. % PLA4060D of the core layer. The non-sealable layer (A) consisted of: 6.6 wt. % of Ecopromote® N3S30 zinc salt masterbatch, 78.5 wt. % PLA4032D, 13.9 wt. % PLA4060D, and 1.0 wt. % of JC20 antiblock PLA masterbatch. The sealant layer (C) consisted of 94 wt. % PLA4060D and 6 wt. % JC-20 masterbatch.

Example 6

Example 5 was repeated except that the non-sealable skin layer (A) consisted of: 6.6 wt. % of Ecopromote® N3S30 zinc salt masterbatch, 77.3 wt. % PLA4032D, 13.6 wt. % PLA4060D, and 2.5 wt. % of JC20 antiblock PLA masterbatch.

Example 7

Example 5 was repeated except that the thickness of the multi-layer film was reduced from nominal 17.5 µm to nominal 12 µm polyweight thickness after biaxial orientation. The core layer (B) was reduced from nominal 14 µm to nominal 9.6 µm; non-sealable skin layer (A) was reduced from nominal 1.5 µm to nominal 1.0 µm; heat sealable layer (C) was reduced from nominal 2.0 µm to nominal 1.4 µm.

Comparative Example 1

Example 1 was repeated except that the core layer (B) composition was changed to 85 wt. % PLA 4032D and 15 wt % PLA4060D. No zinc salt cavitating agent was added to the core.

Comparative Example 2

Example 1 was repeated except that the core layer (B) cavitating agent was changed to 10 wt. % of the Marval 167353 CaCO₃ masterbatch, 76.5 wt. % PLA4032D, and 13.5 wt. % PLA4060D.

Comparative Example 3

Comparative Example 2 was repeated except that the core layer (B) cavitating agent was changed to 40 wt. % of the 167353 Marval CaCO₃ masterbatch, 51.0 wt. % PLA4032D, and 9.0 wt. % PLA4060D.

The BOPLA films were then tested for haze, gloss, density, heat shrinkage, and mechanical properties. Selected examples were metallized and measured for oxygen and moisture barrier properties. Table 1 summarizes the Examples and Comparative Examples' formulations. Table 2 and FIGS. 1-4 illustrate the properties of these examples.

TABLE 1

| | Skin Layer (A) Composition wt. % | | | | Core Layer (B) Composition wt. % | | | Sealable Skin Layer (C) Composition wt. % | |
|---|---|---|---|---|---|---|---|---|---|
| | Cavitating Agent MB | PLA 4032D | PLA 4060D | Antiblock MB | Cavitating Agent MB | PLA 4032D | PLA 4060D | Antiblock MB | PLA 4060D |
| Ex. 1 | 0 | 82.88 | 14.62 | 2.5 | 1.0 N3S30 | 84.15 | 14.85 | 6.0 | 94.0 |
| Ex. 2 | 0 | 82.88 | 14.62 | 2.5 | 3.3 N3S30 | 82.20 | 14.50 | 6.0 | 94.0 |
| Ex. 3 | 3.3 N3S30 | 80.10 | 14.10 | 2.5 | 0 | 85.0 | 15.0 | 6.0 | 94.0 |
| Ex. 4 | 3.3 N3S30 | 81.30 | 14.40 | 1.0 | 3.3 N3S30 | 82.20 | 14.50 | 6.0 | 94.0 |
| Ex. 5 | 6.6 N3S30 | 78.5 | 13.9 | 1.0 | 6.6 N3S30 | 79.40 | 14.00 | 6.0 | 94.0 |
| Ex. 6 | 6.6 N3S30 | 77.3 | 13.6 | 2.5 | 6.6 N3S30 | 79.40 | 14.00 | 6.0 | 94.0 |
| Ex. 7 | 6.6 N3S30 | 78.5 | 13.9 | 1.0 | 6.6 N3S30 | 79.40 | 14.00 | 6.0 | 94.0 |
| CEx. 1 | 0 | 82.88 | 14.62 | 2.5 | 0 | 85.0 | 15.0 | 6.0 | 94.0 |
| CEx. 2 | 0 | 82.88 | 14.62 | 2.5 | 10 CaCO₃ MB | 76.5 | 13.5 | 6.0 | 94.0 |
| CEx. 3 | 0 | 82.88 | 14.62 | 2.5 | 40 CaCO₃ MB | 51.0 | 9.0 | 6.0 | 94.0 |

TABLE 2

| | Haze (single sheet) % | Gloss @ 60° (A-side) | Density g/cm³ | Cavitated Thickness/Nom. Polyweight Thickness μm | Yield in²/lb | Modulus MD/TD kpsi | Elongation MD/TD % | Tensile Strength MD/TD kpsi | Heat Shrink MD/TD % | MVTR cc/m² | O₂TR g/m² |
|---|---|---|---|---|---|---|---|---|---|---|---|
| Ex. 1 | 18 | 102 | 1.21 | 17.5/17.5 | 32,730 | 507/645 | 168/85 | 20.4/33.7 | 4.3/8.8 | 3.56 | 14.95 |
| Ex. 2 | 42 | 91 | 1.20 | 18.25/17.5 | 31,773 | 487/710 | 160/86 | 18.9/34.5 | 4.0/7.5 | 2.96 | 17.07 |
| Ex. 3 | 14 | 90 | 1.21 | 17.25/17.5 | 33,132 | 503/693 | 160/85 | 19.2/25.8 | 4.8/5.8 | 6.01 | 34.8 |
| Ex. 4 | 56 | 67 | 1.16 | 18.5/17.5 | 32,350 | 492/677 | 156/88 | 18.9/30.9 | 4.5/8.5 | 1.77 | 8.64 |
| Ex. 5 | 76 | 33 | 1.16 | 20.0/17.5 | 29,723 | 484/606 | 160/88 | 17.2/28.1 | 4.8/8.0 | 1.86 | 6.52 |
| Ex. 6 | 70 | 56 | 1.16 | 19.75/17.5 | 30,383 | 492/704 | 163/76 | 19.2/29.3 | 5.0/8.0 | 9.27 | 73.1 |
| Ex. 7 | 32 | 30 | 1.10 | 19.25/12.0 | 32,635 | NA | NA | NA | 4.5/9.0 | NA | NA |
| CEx. 1 | 4 | 123 | 1.19 | 18.75/17.5 | 30,938 | 486/737 | 172/85 | 20.3/33.2 | 4.5/9.0 | 2.45 | 13.23 |
| CEx. 2 | 73 | 66 | 1.14 | 21.0/17.5 | 28,903 | 496/682 | 9/81 | 10.2/19.1 | 5.0/7.0 | NA | NA |
| CEx. 3 | 90 | 67 | 1.02 | 23.25/17.5 | 29,329 | 514/653 | 4/25 | 9.7/12.2 | 3.5/4.30 | NA | NA |

As Table 2 shows, Comparative Example 1 (CEx1), which is a control film of a non-cavitated biaxially oriented PLA film with a nearly 100 wt. % amorphous PLA sealant layer (C) showed among the highest density and lowest yield of the Examples. It also showed high clarity or low opacity (low haze and high light transmission), and high gloss. These optical properties are due to the fact that this example is non-cavitated and remained a transparent, glossy film. Tensile properties were one of the highest for these examples, as might be expected, since it is a solid, non-voided film. Similarly, thermal shrinkage was also one of the lowest. After metallizing, gas barrier properties were reasonably good compared to the other examples.

Examples 1 and 2 (Ex1 and Ex2) added 1 wt. % and 3.3 wt. % respectively of the zinc salt of phenylphosphonic acid masterbatch to the core layer as a cavitating agent. The active amount of zinc salt was about 0.3 wt. % and 1.0 wt. % respectively. Ex1 film became very hazy and matte in appearance, with a haze level of 18% vs. CEx1's low haze of 4%. Ex2 film exhibited a white opaque appearance as demonstrated by high haze value of 42%. The gloss for both Examples' A-side (surface of the non-sealable layer (A)) also dropped due to rougher surface caused by cavitation of the core layer as compared to CEx1. However, density, thickness, and yield were about the same as CEx1. It is our speculation that the cavitation voids caused by the zinc salt material are fine enough to cause opacity and not substantially affect overall density of the film. Tensile properties were comparable to CEx1 for modulus, ultimate strength and elongation, indicating retention of good mechanical properties of the cavitated film. Thermal stability was also very comparable to CEx1. Moisture and oxygen barrier properties were comparable to CEx1.

Example 3 (Ex3) tested using the zinc salt of phenylphosphonic masterbatch to the non-sealable skin layer (A) only; no zinc salt masterbatch was used in the core layer. The amount of masterbatch used in the skin layer was about 3.3 wt. % of the skin layer or about 1.0 wt. % of the active zinc salt. Ex3's density, thickness, and yield were comparable to CEx1 and Ex's 1 and 2. Haze, however, was higher than CEx1, indicating that some cavitation of the skin layer occurred. As a result, Ex3's surface gloss was lower, worse than CEx1, and comparable to Ex's 1 and 2; this is due to the rougher surface caused by cavitation. Tensile properties and heat shrinkage was comparable to CEx1 and Ex's 1 and 2; as only the skin layer was cavitated, it was not expected that these properties would have been significantly affected since the bulk core layer was unmodified. Gas barrier properties after metallizing, however, were noticeably worse than CEx1 and Ex's 1 and 2. This may have been due to the cavitated skin layer being a rougher and voided surface, thus disrupting metal deposition and continuity vs. CEx1 and Ex's 1 and 2.

Examples 4, 5 and 6 (Ex4, Ex5, and Ex6) tested using the zinc salt of phenylphosphonic masterbatch to both the non-sealable skin layer (A) and the core layer (B). Ex4 used 3.3 wt. % zinc salt masterbatch in both layers (active amount of zinc salt was about 1.0 wt. %); Ex's 5 and 6 used 6.6 wt. % zinc salt masterbatch in both layers (active amount of zinc salt was about 2.0 wt. %). The difference between Ex5 and Ex6 was the amount of antiblock used in the non-sealable skin layer (A): Ex5 used about 1.0 wt. % antiblock masterbatch (ca. 200 ppm active antiblock particles) and Ex6 used about 2.5 wt. % antiblock masterbatch (ca. 500 ppm active antiblock particles). As shown in Table 2, density of these Examples were significantly lower than CEx1 and the previous Ex's 1-3 due to the higher loading of zinc salt masterbatch and consequent higher degree of cavitation. Cavitated thickness also increased, particularly for Ex's 5 and 6. Haze was significantly increased for these Examples and gloss significantly lowered due to higher cavitation. However, despite the higher degree of cavitation, tensile properties (modulus, elongation, and ultimate strength) and heat shrinkage were surprisingly comparable to CEx1. Also surprisingly, gas barrier properties after metallizing for Ex's 4 and 5 were comparable or better than CEx1.

Example 7 (Ex7) was similar in formulation as Ex5 but the extruder output for the core layer (B) and skin layers (A) and (C) were lowered to target a polyweight gauge of 12 µm instead of 17.5 µm. Cavitated thickness was increased significantly to about 19 µm and density significantly lowered to about 1.10. High haze and low gloss values both indicated cavitation as seen in previous Examples. Tensile properties and gas barrier were not tested on this sample; however, thermal shrinkage was comparable to CEx1 and previous Examples.

Comparative Examples 2 and 3 (CEx2 and CEx3) added 10 wt. % and 50 wt. % respectively of a calcium carbonate masterbatch to the core layer only as a cavitating agent. Active amount of $CaCO_3$ was about 4 wt. % and 16 wt. % of the core layer respectively. As shown in Table 2, density was significantly lowered and cavitated thickness significantly increased over polyweight thickness due to the mineral cavitator and high loading, particularly in the case of CEx3. Haze and gloss were also significantly affected due to the cavitation effect. Tensile properties for modulus was quite good—perhaps due to the increased thickness from cavitation; however, elongation and ultimate strength were very poor compared to CEx1 and the Examples. This is due to the large number and large sizes of the voids created by the $CaCO_3$ cavitating agent which caused the film to become brittle and weak. Heat shrinkage was generally good. Gas barrier properties were not tested.

FIG. 1 summarized the densities of selected Examples and Comparative Examples. As shown in the Figure, the zinc salt cavitating agent appeared to be a much more efficient cavitator than mineral cavitating agents such as calcium carbonate (a commonly used and inexpensive cavitating agent). To achieve similar level of density reduction through cavitation—for example, 1.10-about 3 wt. % of active zinc salt was needed vs. about 9 wt. % of active calcium carbonate amount. Thus, the zinc salt cavitating agent could be about 3 times more efficient cavitator than calcium carbonate. In addition, the tensile properties of the zinc salt cavitated film appeared much better than that of calcium carbonate cavitated film. This may be due to finer and smaller voids formed by the zinc salt cavitator vs. calcium carbonate.

Figure 2:
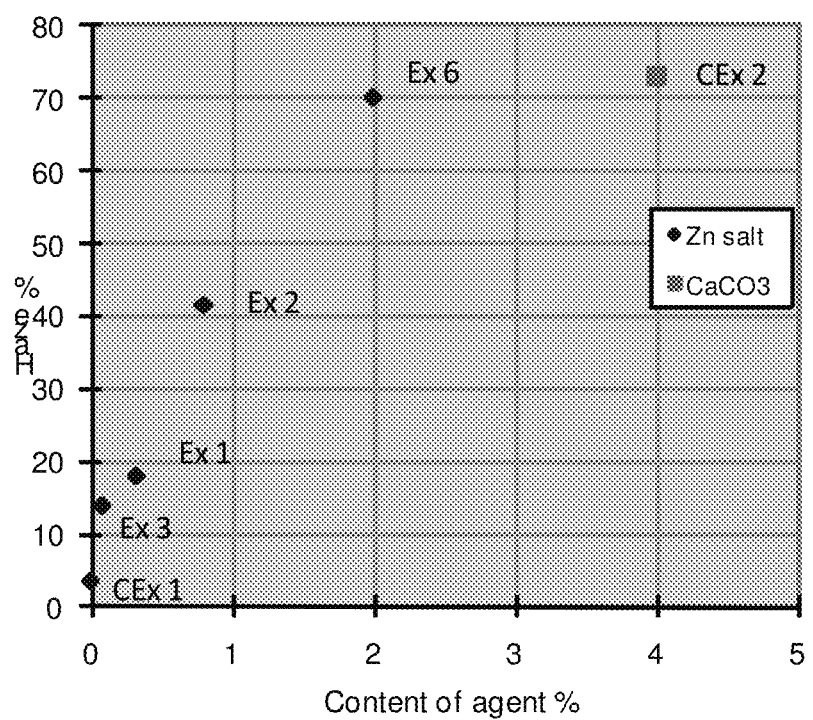
FIG. 2 is a graph of haze % v. wt. % of cavitating agent for selected Examples and Comparative Examples using zinc salt and calcium carbonate cavitating agents.

FIG. 2 summarized haze properties of selected Examples and Comparative Examples. The Figure indicated that the zinc salt cavitating agent again appeared more efficient that calcium carbonate at achieving opacity. For example, to achieve 70% haze level, about 2 wt. % of active zinc salt in the PLA film was needed; about 4 wt. % of calcium carbonate was required in comparison. Thus, the zinc salt cavitator could be about 2 times more efficient at achieving desired opacity than mineral cavitators like calcium carbonate.

Figure 3:
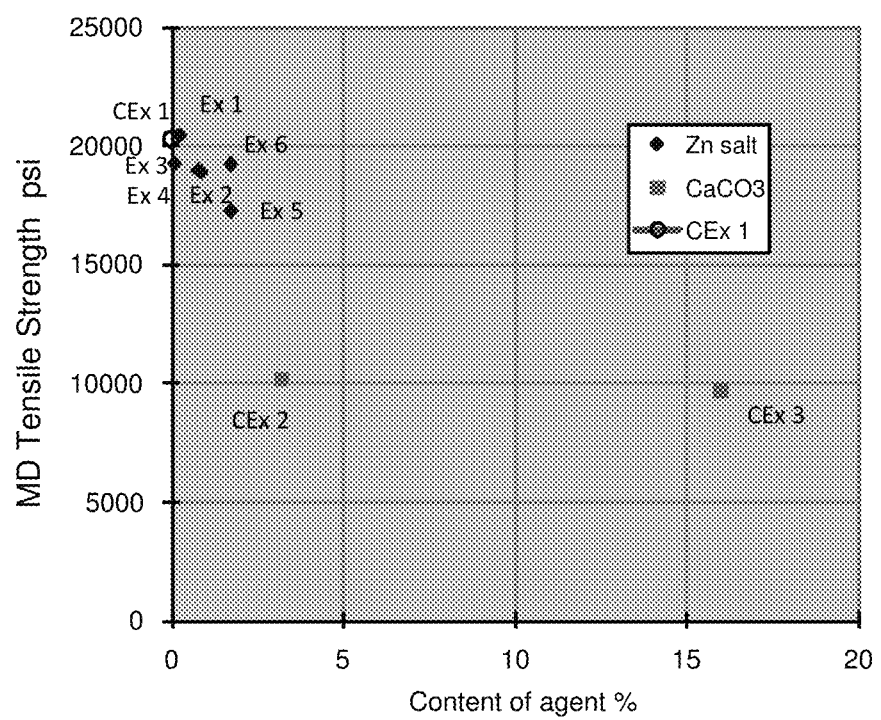
FIG. 3 is a graph of MD (machine direction) tensile strength v. wt. % of cavitating agent for selected Examples and Comparative Examples using zinc salt and calcium carbonate cavitating agents.
Figure 4:
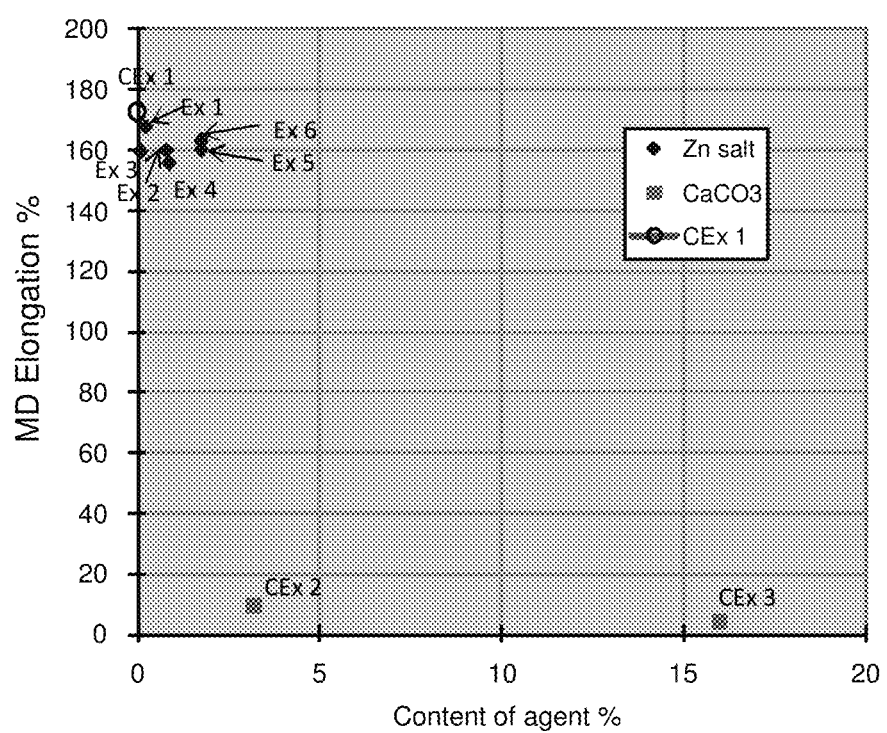
FIG. 4 is a graph of MD (machine direction) elongation % v. wt. % of cavitating agent for selected Examples and Comparative Examples using zinc salt and calcium carbonate cavitating agents.

FIGS. 3 and 4 summarized MD (machine direction) tensile (or ultimate) strength and MD elongation of selected Examples and Comparative Examples. As shown by these Figures, the zinc salt cavitating agent was more effective at maintaining desirable tensile properties and elongation in comparison to calcium carbonate. This was especially powerful when considering the data in these Figures with that of FIGS. 1 and 2. In FIGS. 1 and 2, to achieve a desirable opacity of—for example—70% haze and a lower density of about 1.10, the amount of zinc salt cavitating agent required was about 2 and 3 wt. %, respectively, of the film. The amount of calcium carbonate required, however, was about 4 wt. % and 9 wt. %, respectively. Using 2-3 wt. % of zinc salt cavitating agent, however, had little effect on reducing the desirable MD tensile strength and elongation of the film—indicators of the mechanical strength of the cavitated film. As FIGS. 3 and 4 showed, this amount of zinc salt cavitation had only a minor decrease in these mechanical properties compared to uncavitated film (e.g. CEx1). In contrast, the amount of calcium carbonate needed to achieve the same optical qualities—high haze or opacity—and lower density, resulted in a mechanically very weak film, with significant losses in tensile strength and elongation.

In conclusion, the use of zinc salt of phenylphosphonic acid as a cavitating agent can be an effective method to cavitate PLA films to obtain attractive white opaque films with lower density and higher yields. Mechanical properties of the film can also be maintained adequately compared to non-cavitated PLA film and much better than mineral-based cavitating agents like calcium carbonate. Indeed, the use of zinc salt and other metal salts as cavitating agents can provide such desirable properties more efficiently than mineral cavitators by requiring a smaller active amount.

Test Methods

The various properties in the above examples were measured by the following methods:

Transparency of the film was measured by measuring haze of a single sheet of film using a hazemeter model like a BYK Gardner "Haze-Gard Plus®" substantially in accordance with ASTM D1003.

Gloss of the film was measured by measuring the desired side of a single sheet of film via a surface reflectivity gloss meter (BYK Gardner Micro-Gloss) substantially in accordance with ASTM D2457. The A-side was measured at a 60° angle; the C-side or sealant layer side was measured at a 20° angle.

Light transmission of the film was measured by measuring light transmission of a single sheet of film via a light transmission meter (BYK Gardner Haze-Gard Plus) substantially in accordance with ASTM D1003.

Film density was calculated by taking a stack of 10 sheets (letter paper size e.g. 8.5 inches by 11 inches) of film and cutting them via a die of area 33.69 cm² and weighing the cut sheets on an analytical scale. The 10 sheets are also measured for thickness using a flat-head micrometer to get an average thickness of the film. The measured weight and thickness is then used in a calculation to obtain density:

$$\frac{\text{Weight (g)}}{\text{Thickness (cm)} \times \text{area (cm}^2)} = \text{Density (g/cm}^3)$$

Film yield is calculated using film density and thickness by the following formula:

$$\frac{453.59}{\text{Density (g/cm}^3) \times (2.54)^3 \times \text{thickness (inches)}} = \text{Yield (in}^2/\text{lb)}$$

Tensile properties such as Young's modulus, ultimate strength, and elongation are measured substantially in accordance with ASTM.

Moisture transmission rate of the film was measured by using a Mocon Permatran 3/31 unit substantially in accordance with ASTM F1249. A hand-lamination was made of the metallized PLA film using a 80 G (20 μm) PLA (D %=1 to 4%) film with a pressure-sensitive adhesive in order to protect the metallized film surface from handling damage. Thus, the 80 G PLA film was used as a protective film. There is no limitation of the grade of the protective PLA film since the transparent plain PLA protective film itself has a much higher MVTR (typically >10 g/m²/day or so.) The pressure-sensitive adhesive side of the protective PLA film would be adhered to the metallized side of the example film with a rubber roller to eliminate air pockets, bubbles, and wrinkles. In general, preferred values of MVTR would be equal or less than 5.0 g/m²/day and preferably 2.0 g/m²/day or less at 38° C. and 90% relative humidity.

Oxygen transmission rate of the film was measured by using a Mocon Oxtran 2/20 unit substantially in accordance with ASTM D3985. A hand-lamination was made of the metallized PLA film using the same 80 G (20 μm) transparent plain PLA film with a pressure-sensitive adhesive described above in order to protect the metallized film surface from handling damage. The pressure-sensitive adhesive side of the protective film would be adhered to the metallized side of the example film with a rubber roller to eliminate air pockets, bubbles, and wrinkles. In general, preferred values of $O_2TR$ would be equal or less than 46.5 cc/m²/day and preferably 30 cc/m²/day or less at 23° C. and 0% relative humidity.

Compostability and degradability of the test films were measured substantially in accordance with ASTM procedure D-6400 "Compostable Plastics," sub-group procedure D-5338 "Disintegration Test." This ASTM procedure is also known as ISO 1629 in the International Standards test procedures. In essence, the test films are aged under composting conditions of 58° C. for 180 days maximum duration in a compost medium and films are observed and rated for disintegration. Preferably the test films would degrade completely within 180 days (26 weeks) and more preferably, within 105 days (15 weeks).

Thickness: Total thickness of the films was measured using a micro-gauge meter in several areas and averaging the result; the thickness of each co-extruded layer was determined based upon a ratio of extruder output.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A film comprising:
a cavitated biaxially oriented layer comprising polylactic acid and a single cavitating agent consisting of a zinc salt of a phosphorous compound.

2. The film of claim 1, wherein the metal salt of a phosphorous compound comprises 0.1 to 10 wt. % of the layer comprising polylactic acid.

3. The film of claim 1, wherein the cavitated biaxially oriented layer comprising polylactic acid has a plurality of voids and cavities and a density of less than 1.20 g/cm$^3$.

4. The film of claim 1, wherein the phosphorous compound is a phenylphosphonic acid.

5. The film of claim 1, wherein the film has a white opaque appearance.

6. The film of claim 1, wherein the film has a haze of 40 to 100%.

7. The film of claim 1, wherein the film has a machine direction (MD) tensile strength of at least 15 kg/mm$^2$ and a transverse direction (TD) tensile strength of at least 25 kg/mm$^2$.

8. The film of claim 1, wherein the film has an elongation to break of at least 150% in the machine direction (MD) and at least about 70% in the transverse direction (TD).

9. The film of claim 1, further comprising a metal layer on one side of the cavitated biaxially oriented layer comprising polylactic acid.

10. The film of claim 9, wherein the metal layer has an optical density of 2.0-4.0.

11. The film of claim 9, wherein the metal layer comprises aluminum.

12. The film of claim 9, wherein the film has an oxygen gas barrier of less than 46.5 cc/m$^2$/day and a moisture vapor barrier of less than 5 g/m$^2$/day.

13. The film of claim 9, wherein the film has an oxygen gas barrier of less than 30 cc/m$^2$/day and a moisture vapor barrier of less than 2.0 g/m$^2$/day.

14. The film of claim 1, wherein the cavitated biaxially oriented layer comprises crystalline polylactic acid with 90-100% L-lactic acid units.

15. The film of claim 1, further comprising a heat seal layer on a surface of the cavitated biaxially oriented layer comprising polylactic acid.

16. The film of claim 15, wherein the heat seal layer comprises polylactic acid.

17. The film of claim 1, wherein the cavitated biaxially oriented layer further comprises an ethylene-acrylate modifier.

18. A film comprising:
a cavitated biaxially oriented layer comprising polylactic acid and a single cavitating agent consisting of a zinc salt of a phosphorous compound; and
a heat seal layer comprising polylactic acid.

19. A method of making a film comprising:
extruding a layer comprising polylactic acid and a single cavitating agent consisting of a zinc salt of a phosphorous compound; and
biaxially orienting the layer comprising polylactic acid and the single cavitating agent consisting of the metal salt of a phosphorous compound to produce a film comprising a cavitated biaxially oriented layer comprising polylactic acid and the single cavitating agent consisting of the metal salt of a phosphorous compound.

20. The method of claim 19, wherein the film is oriented at least 2× in the machine direction and at least 3× in the transverse direction.

21. The method of claim 19, wherein the film is oriented at least 2× in the machine direction and at least 8× in the transverse direction.

22. The method of claim 19, wherein a heat seal layer comprising polylactic acid is coextruded with the layer comprising polylactic acid and a metal salt of a phosphorous compound.

23. The method of claim 19, wherein the cavitated biaxially oriented layer comprising polylactic acid has a plurality of voids and cavities and a density of less than 1.20 g/cm$^3$.

24. The method of claim 19, wherein the phosphorous compound is a phenylphosphonic acid.

25. The method of claim 19, wherein the film has a haze of 40 to 100%.

26. The method of claim 19, further comprising depositing a metal layer on a surface of the cavitated biaxially oriented layer comprising polylactic acid.

27. The method of claim 19, wherein the metal layer has an optical density of 2.0-4.0.

28. The method of claim 19, wherein the metal layer comprises aluminum.

29. The method of claim 19, wherein the film has an oxygen gas barrier of less than 46.5 cc/m$^2$/day and a moisture vapor barrier of less than 5 g/m$^2$/day.

* * * * *